United States Patent [19]

Jochem et al.

[11] Patent Number: 4,913,715
[45] Date of Patent: Apr. 3, 1990

[54] METHOD OF MANUFACTURING AN OPTICAL FIBER HAVING A PROTECTIVE COATING

[75] Inventors: Cornelis M. G. Jochem; Jacobus W. C. Van Der Ligt, both of Eindhoven, Netherlands

[73] Assignee: U.S. Philips Corp., New York, N.Y.

[21] Appl. No.: 283,003

[22] Filed: Dec. 8, 1988

Related U.S. Application Data

[63] Continuation of Ser. No. 948,469, Dec. 29, 1986, abandoned, which is a continuation of Ser. No. 679,329, Dec. 7, 1984, abandoned.

[30] Foreign Application Priority Data

Sep. 13, 1984 [NL] Netherlands .................. 8402799

[51] Int. Cl.$^4$ ........................................ C03B 37/023
[52] U.S. Cl. ........................................ 65/3.11; 65/12; 65/13
[58] Field of Search ............... 65/3.11, 3.4, 3.44, 65/3.43, 3.1, 12, 13

[56] References Cited

U.S. PATENT DOCUMENTS

| 3,540,870 | 11/1970 | Li ........................................ 65/12 X |
| 4,208,200 | 6/1980 | Claypoole ........................... 65/12 X |
| 4,437,870 | 3/1984 | Miller ................................. 65/13 X |
| 4,514,205 | 4/1985 | Dareangelo ........................ 65/13 X |

FOREIGN PATENT DOCUMENTS

| 0097669 | 5/1983 | European Pat. Off. . |
| 0079186 | 7/1983 | European Pat. Off. . |
| 755899 | 3/1971 | France ................................. 65/3.44 |

Primary Examiner—Peter Kratz
Attorney, Agent, or Firm—William L. Botjer

[57] ABSTRACT

A method of and a device for manufacturing an optical fiber with a protective coating. A cooling device cools the fiber after drawing from a preform. The cooling device comprises a forced-cooled double-walled tube. In the space enclosed by the inner tube through which the fiber to be cooled is passed, a gas is present which has good heat-transporting properties. The gas may be, for example, helium. Cooling of the fiber takes place by heat dissipation via the helium to the forced-cooled tube wall.

17 Claims, 2 Drawing Sheets

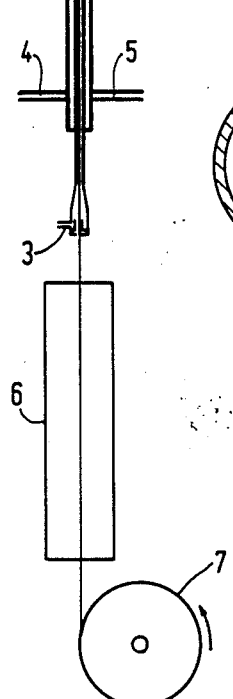
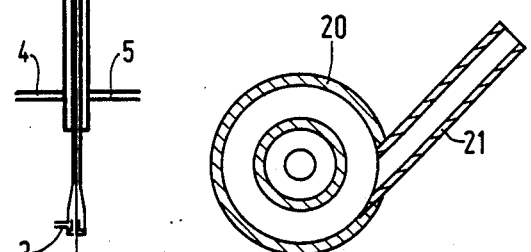
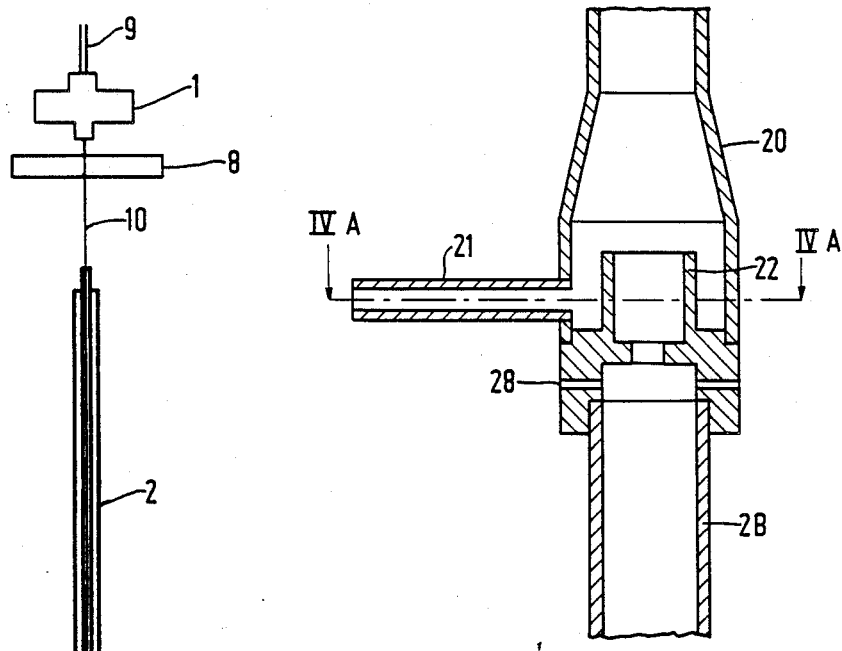
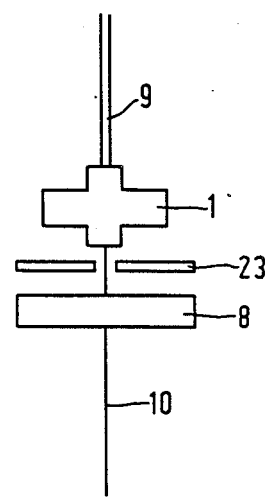
FIG.1
FIG.4A
FIG.4
FIG.5

METHOD OF MANUFACTURING AN OPTICAL FIBER HAVING A PROTECTIVE COATING

This is a continuation of application Ser. No. 948,469, filed Dec. 29, 1986 which is a continuation of application Ser. No. 679,329 filed Dec. 7, 1984 both abandoned.

BACKGROUND OF THE INVENTION

The invention relates to a method of manufacturing an optical fiber having a coating of a protective material such as a synthetic resin. In the method the fiber is drawn from the end of a preform heated to the drawing temperature. The hot fiber is cooled by pulling the fiber through a gas-filled cooling device. The cooled fiber is then passed through a coating device in which the coating material is provided.

The invention also relates to a cooling device for performing the method according to the invention.

A known cooling device is described in, for example, international patent WO 83/02268. The device described in that application consists mainly of a porous pipe through which the fiber is passed. Nitrogen is led through the porous wall of the pipe on all sides into the space enclosed by the pipe. Thermal energy is carried away by the flowing gas. Only the heat-absorbing power of the gas, in this case nitrogen, is used for cooling. Because comparatively large quantities of gas are necessary for this purpose, measures must be taken to prevent the fiber from starting to vibrate under the influence of the gas flow. For this purpose the pipe is porous.

Another known cooling device is described in European Patent Application 0,079,186. In this device, the fiber is cooled only or predominantly by cooled helium which is passed along the fiber. Forced cooling of the fiber permits a higher fiber drawing rate than is possible with natural cooling. When the hot fiber is not cooled by forced cooling and the distance between the preform and the coating device is not sufficiently long, it is possible that at high drawing rates the fiber will not cool by natural processes (radiation etc.) to a temperature which is permissible for providing a protective coating. When the temperature of the fiber, at the moment it is contacted with the protective coating material in the device is too high, the fiber is not sufficiently wetted by the coating material and the coating material may decompose. This may result in a poor quality protective coating.

The device according to European patent application 0,079,186 comprises a tube into which the fiber is guided immediately after drawing. Cooled, dry helium is passed into the tube in such manner that the direction of flow has a component directed radially with respect to the fiber and another component against the direction of movement of the fiber. The tube has a heat-insulating envelope to minimize heat absorption by the cooled helium from the ambient atmosphere. Such heat absorption would reduce the heat-absorbing and hence cooling capacity of the device.

According to a particular embodiment (see also U.S. Pat. No. 4,437,870), the helium is supplied over substantially the whole tube length via a porous tube which surrounds the fiber on all sides. The porous tube in this device is placed within a double-walled tube. The inside diameter of the double-walled tube is larger than the outside diameter of the porous tube. Cooled helium is blown into the space between the porous tube and the inner wall of the double-walled tube. The blown-in helium diffuses through the porous tube into the space inside the porous tube through which the fiber is passed. Since the helium flows from all sides toward the fiber, there is no danger of the fiber starting to vibrate.

Liquid nitrogen is present in the space between the walls of the double-walled tube to prevent the cooled helium from absorbing heat from the surrounding atmosphere. The liquid nitrogen only functions as a heat insulator. In the device, no thermal energy from the hot fiber is dissipated in the liquid nitrogen. Only the heat-absorbing capacity (thermal capacity) of the cooled helium is used to cool the fiber. The thermal energy dissipated by the fiber is drained from the device with the helium. At a drawing rate of 5 m/sec, a helium flow rate (through a device having an inside tube diameter of 12.7 mm) of 39.9 l/min is given in the patent application. At this high gas rate, it is obvious that precautions must be taken to prevent the fiber from starting to vibrate in the cooling device. Without such precautions, vibration might cause a fracture and a asymmetrical synthetic resin coating. In view of the high gas flow rates required in the device according to EP 0,079,186 it may be derived that heat transfer via the gas to the wall of the device and via the wall to the atmosphere is out of the question.

SUMMARY OF THE INVENTION

It is an object of the invention to provide a method of and a device for cooling an optical fiber in which the gas flow is reduced and hence vibration of the fiber is reduced.

This object is achieved by a method in which the fiber is cooled substantially by heat transfer to a forced-cooled wall. The gas surrounding the fiber functions as a heat-transporting medium. In the method according to the invention, the thermal energy dissipated by the fiber is dissipated predominantly via the cooled wall to the coolant with which the wall is cooled. In order to provide a high heat-transporting capacity, a liquid coolant is preferably used for this purpose.

The gas flow in the method according to the invention may be comparatively small. However, the gas flow must at least be sufficient to prevent the penetration of the surrounding atmosphere via the apertures through which the fiber enters and leaves the device, and to compensate for loss of gas through these apertures. Preferably, the gas is passed through the device opposite to the direction of movement of the fiber.

Advantageously, helium and/or hydrogen are used as a heat-transporting gas in the method according to the invention. The heat-transporting properties of helium and hydrogen are particularly high compared to other gases. Helium is preferred because it is safer to use. Helium-hydrogen mixtures having a quantity of hydrogen which when in contact with the surrounding atmosphere does not form explosive or combustible gas mixtures might also be used.

At a drawing rate of 6 m/sec and a helium flow rate of 6 l/min the fiber temperature could be cooled down to 60° with water cooling of the cooled wall. The temperature of the fiber when entering the cooling device was approximately 800°. The helium was not cooled and had a temperature when entering the hollow tube of approximately 20° C. If sufficient safety precautions are followed pure hydrogen might be used.

According to a further advantageous embodiment of the method according to the invention, the cooled wall was cooled to a temperature below the ambient temperature. As a result, the temperature gradient between the fiber and this wall is steeper than when the wall is at ambient temperature. This may increase the heat transport and hence reduce the length of the cooling device with the drawing rate remaining the same. Alternatively, when the device length remains the same, the drawing rate may be increased.

The method according to the invention has the additional advantage that a gaseous or a volatile material may be added to the helium which acts on the fiber surface in such manner that the bonding to the synthetic resin coating is influenced thereby and/or the reactivity of the fiber surface with water vapor is reduced.

A device for drawing a fiber from a preform and providing a coating of protective material such as a synthetic resin on the fiber comprises a furnace for heating one end of a preform to the fiber drawing temperature and a device for providing a protective coating on the fiber drawn from the preform. A cooling device is arranged between the furnace and the coating device. The cooling device cools the fiber to a temperature which is suitable for providing the protecting coating.

According to the invention, the cooling device comprises a hollow tube, means for providing an atmosphere of a heat transporting gas in the space enclosed by the hollow tube and through which the fiber is passed, and means to cool the hollow tube.

The hollow tube is preferably cooled with a liquid because better cooling can be obtained than when the hollow tube is cooled by a gas. Another possibility is a Peltier system.

Of course, the hollow tube preferably consists of a readily heat-conducting metal, for example aluminium, copper, or an alloy of these metals. An increased heast dissipation can be achieved if the inside of the hollow tube (facing the fiber) is blackened to increase heat absorption. The inside of the tube may be blackened by providing a layer of, for example, finely divided nickel or cobalt sulphide.

A suitable inside diameter for the tube is between 10 mm and 20 mm. The means to cool the hollow tube may be, for example, an outer tube surrounding the inner tube having an inlet and an outlet for passing a liquid coolant through the hollow space between the two tubes. A suitable spacing between the two tube walls bounding the space for the coolant is, for example, between 5 and 15 mm. Cooling ribs connected to the inner wall of the hollow tube may project into the space between the two tubes. It is also possible to provide a helical partition in the space between the two tubes, so that the coolant is forced to moved helically around the hollow tube in the space between the two tubes. It is also possible, however, to helically provide a cooling tube through which the coolant is guided on the hollow tube on the side remote from the fiber.

The hollow tube, at the end where the fiber leaves the tube, i.e. on the side toward the coating device, preferably comprises a gas inlet in the form of a tube which opens into the sapce enclosed by the hollow tube. In this manner the heat transporting gas is introduced in such manner that it flows through the tube opposite the fiber.

In order to support the fiber, the hollow tube is closed but for a small opening for the fiber. This may be formed suitably by a diaphragm with which the diameter of the fiber drawing aperture can be reduced to a desired small diameter at the instant the fiber moves through the hollow tube in a stable manner, i.e. without swinging or vibrating.

Vibrating and swinging of the fiber can be prevented, for example, by supplying the gas via a tube which is accommodated tangentially with respect to the hollow tube and which opens into the space enclosed by the hollow tube. According to a favorable embodiment, a gas supply tube having an inside diameter sufficient to pass the fiber is accommodated in the hollow tube between the opening of the gas inlet tube and the axis of the hollow tube. The gas supply tube does not extend any farther into the hollow tube, i.e. toward the furnace, than is necessary to prevent the fiber from starting to vibrate or swing as a result of the entering heat transporting gas.

Although, as has been found in practice, the fiber can be cooled to a sufficiently low temperature by the device described, various measures still seem to be possible to improve the quality of the fiber. For example, it is favorable to minimize the contact between the fiber and the surrounding atmosphere between the cooling device and the coating device. One possibility is to connect these two devices directly together. Another possibility is to provide the hollow tube at the end where the fiber leaves the hollow tube (i.e. at the end facing the coating device) with an open chamber which is open on the side remote from this end and which comprises a gas inlet tube for blowing-in a dry and dust-free gas. When the fiber enters the cooling device air may be dragged into the cooling device, which may decrease the heat transporting capacity of the gas in the hollow tube. If necessary, this may be prevented by providing the hollow tube at the inlet end (i.e. at the end facing the furnace) with a chamber which is open on the side remote from this end comprising a gas inlet tube for blowing the gas, which is used as a heat transporting medium in the hollow tube, into the chamber.

The cooling capacity can be further increased by providing between the furnace and the cooling device a radiation screen, for example consisting of a metal mirror reflecting thermal energy. For example, an aluminum radiation screen may be used to reflect thermal radiation originating from the furnace.

BRIEF DESCRIPTION OF THE DRAWING

FIG. 1 is a schematic sectional view of a device according to the invention.

FIG. 4 is a sectional view of a detail of the device with an extra gas inlet.

FIG. 4A is a sectional view on the line IV—IV of FIG. 4.

FIG. 5 schematically shows a part of the device shown in FIG. 1 with a radiation screen.

DESCRIPTION OF THE PREFERRED EMBODIMENTS

Figures 2, 3:
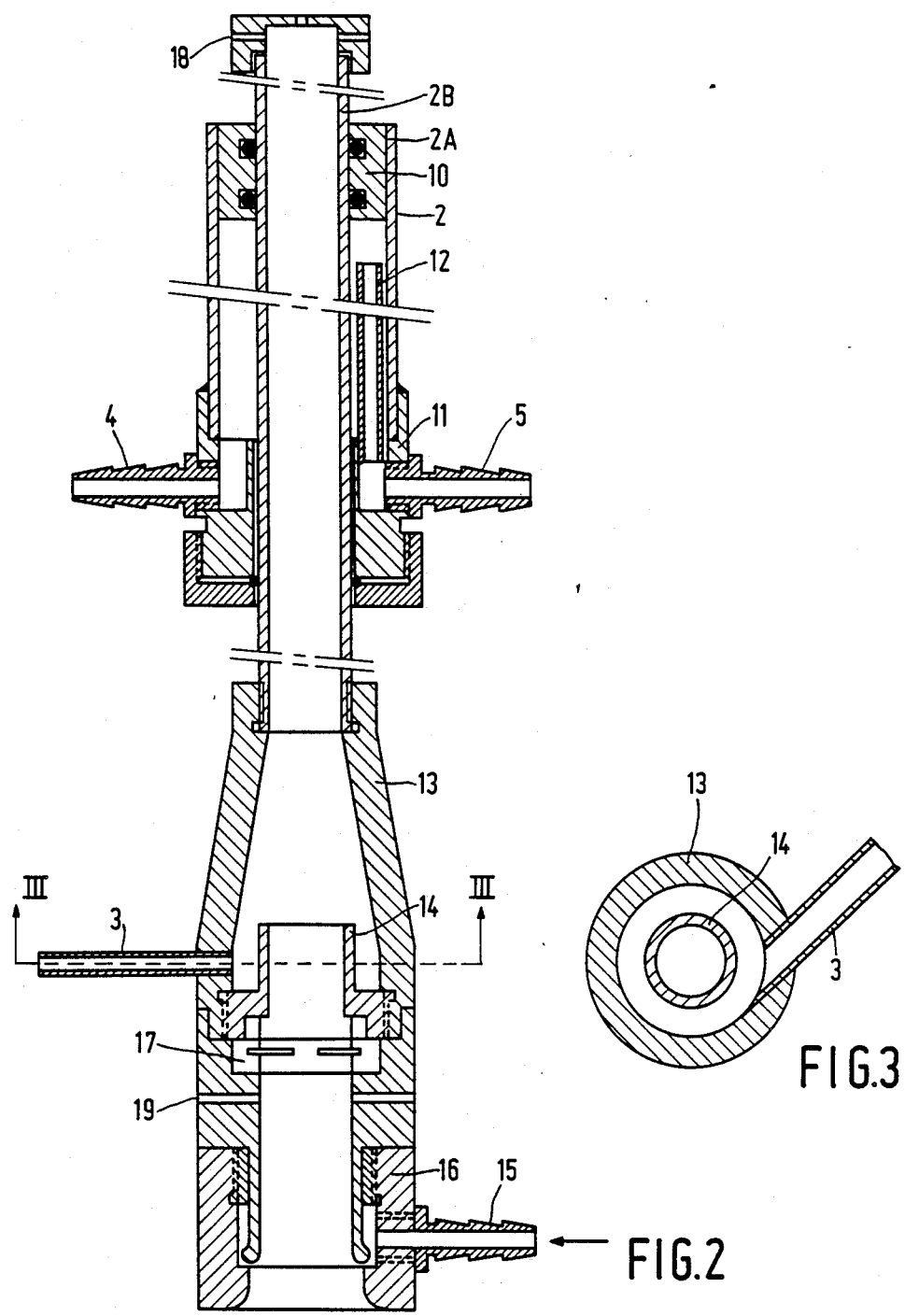
FIG. 2 is a sectional view of a cooling device which may be used in the device shown in FIG. 1.
FIG. 3 is a sectional view on the line III—III of FIG. 2.

Referring to FIG. 1, the device according to the invention comprises a drawing furnace 1, and a double-walled metal tube 2. Tube 2 has a gas inlet 3 for supplying, for example, helium to the chamber inside the inner wall of the tube 2. Tube 2 further includes an inlet tube 4 and an outlet tube 5 for supplying and draining, respectively, coolant to and from the space between the double walls of tube 2.

The device further comprises a device 6 for providing and curing a synthetic resin coating on a fiber. The resin coating functions as a protective coating. FIG. 1 further shows a winding reel 7 and a device 8 for continuously measuring the fiber diameter. Device 8 controls the drawing rate as a function of the fiber diameter.

The device is used as follows. A fiber 10 is drawn from a preform 9. The drawing rate is controlled via the diameter monitor 8 so that the fiber 10 has a diameter which is as constant as possible. Fiber 10 then passes into the cooling device. The cooling device includes a double-walled tube 2 in which the fiber is cooled to a temperature at which the synthetic resin coating can be provided. Tube 2 is cooled, for example, with water via inlet tube 4 and outlet tube 5. After a layer of synthetic resin has been provided on the fiber and cured in the device 6, the fiber is reeled on the drum 7.

FIG. 2 shows an embodiment of a cooling device in greater detail as it may be used in the device according to the invention. The cooling device, shown in a sectional view, comprises a double-walled tube 2 having an outer wall 2A and an inner wall 2B of a readily heat conducting material. In a practical experiment, wall 2B was an aluminum tube having an inside diameter of 16 mm and an outside diameter of 20 mm and a length of 220 cm. The sapce between the tubes was 7 mm.

In the space between the walls 2A and 2B and seals 10 and 11, a coolant is supplied via the inlet tube 4. The coolant is drained via the outlet tube 5. In the embodiment shown, outlet 5 opens at the top into the sealed space between the tubes 2A and 2B via extension tube 12. The coolant may be tap water, but a liquid cooled below ambient temperature may also be circulated by pumping. In that case the coolant may be a saline solution or a liquid having a freezing-point below ambient temperature (for example, trichlorofluoromethane, propylene glycol, ethylene glycol, methylene glycol, trichloroethylene, acetone, methyl alcohol, or ethyl alcohol).

The cooling device further comprises a gas inlet pipe 3 through which a heat-transporting gas can be led into the space enclosed by the tube 2B. The heat-transporting gas may be, for example, helium and hydrogen. From the point of view of safety, helium or mixtures of helium and hydrogen (which when mixed with air do not ignite or explode at high temperatures) are preferred. The heat-transporting gas is introduced tangentially via the gas inlet 3 into the conically widened portion 13 which adjoins the tube 2B, as shown in FIG. 3. With a view to preventing the fiber from starting to vibrate at this area, a protective tube 14, having an inside diameter of 16 mm and an outside diameter of 20 mm, is present at the level of the gas inlet 3 in the conically widened portion 13 which adjoins the tube 2B.

It has been found desirable in practice to protect the fiber as much as possible from water vapor and dust when it leaves the cooling device 2 and before it is coated with synthetic resin in the coating device 6 (FIG. 1). For this purpose, according to a preferred embodiment of the device, a dry protective gas, for example nitrogen or helium, is blown, via the gas inlet 15, into the chamber 16 which is open at its lower side and envelops the fiber leaving the device.

The cooling device further comprises a diaphragm 17 (FIG. 2) for minimizing the aperture through which the fiber leaves the cooling space so as to minimize the loss of helium in the direction of movement of the fiber. Via the apertures 18 and 19 at the fiber inlet end and the fiber outlet end of the device, respectively, the cooling device can be positioned with respect to the fiber so that the fiber is arranged as near as possible on the axis of the tube 2B.

By means of the cooling device shown in FIG. 2, the fiber temperatures recorded in Table 1 were achieved with a helium flow rate of 4 liters per minute. Tube 2B had a length of 220 cm and an inside diameter of 16 mm. Tube 2B was of aluminum and had a wall thickness of 2 mm. Tube 2B was cooled with tap water at a flow rate of 1 to 2 l/min. The helium was not cooled. The fiber temperature at the entrance to the cooling device was approximately 800° C.

TABLE 1.

| Fiber speed (m/sec) | Fiber temperature in °C. on leaving the cooling device |
| --- | --- |
| 4 | 50 |
| 5 | 60 |
| 6 | 75 |

When the fiber speed was kept constant at 6 m/sec and the supply of helium was varied, the results recorded in Table 2 were achieved.

TABLE 2.

| Helium flow rate (liters per minute) | Fiber temperature in °C. on leaving the cooling device |
| --- | --- |
| 2 | 120 |
| 3 | 100 |
| 4 | 75 |
| 6 | 60 |

It is clear from Table 2 that increasing the gas flow rate influences the cooling rate and the final fiber temperature comparatively little. By increasing the helium supply, the dragging along of air by the fiber in the device is substantially reduced.

An increased cooling capacity can be obtained by blackening the inner wall of tube 2B. The cooling capacity can also be increased by providing the inlet end of tube 2B with a helium supply device to prevent the dragging along of air by the fiber. A radiation screen 23, to screen radiation heat, may also be used. Screen 23 may be for example, aluminum.

FIG. 4 is a sectional view of an extra helium supply device consisting of an enveloping portion 20 and a gas supply pipe 21 through which gas is supplied tangentially (see FIG. 4A). A pipe 22 is present within the enveloping portion 20. Pipe 22 prevents helium supplied through the inlet pipe 21 from causing the fiber to vibrate. The helium supply device is present at the top end of pipe 2B (see FIG. 1).

FIG. 5 shows the radiation screen 23 arranged between furnace 1 and diameter monitor 8.

What is claimed is:

1. A method of manufacturing an optical fiber with a protective coating, said method comprising the steps of:
   providing a hot preform;
   drawing a hot optical fiber from the end of said hot preform;
   passing the hot fiber through the space enclosed by a hollow cooling tube comprising means for providing an atmosphere of a heat-conductive gas in the space enclosed by the hollow tube and a second tube surrounding the inner tube having means for cooling the inner tube with a coolant, said tube having ends containing apertures and being heat-conductive;

cooling the tube using a non-cryogenic coolant;

flowing a heat-conductive gas through the space enclosed by the cooling tube so as to cool and conduct heat from the fiber sufficient to permit coating of the cooled fiber with a coating material, a substantial amount of the heat being removed by conducting heat from the fiber to the tube by the heat-conductive gas; the gas flow being at least that flow that is sufficient to prevent the penetration of the surrounding atmosphere through the apertures of the ends of said cooling tube and to compensate for loss of gas through said end apertures but less than the flow that prevents the heat-conductive gas from conducting heat to the wall of the tube; and coating the cooled fiber with a protective coating.

2. A method as claimed in claim 1, wherein:

the cooling tube has an outer surface; and the cooling tube is cooled by passing a coolant liquid over the outer surface of the tube.

3. A method as claimed in claim 2, wherein the coolant liquid is water.

4. A method as claimed in claim 2, wherein the coolant liquid is at a temperature below ambient.

5. A method as claimed in claim 2, wherein the hollow tube is made of aluminum.

6. A method as claimed in claim 2, wherein the hollow tube is made of copper.

7. A method as claimed in claim 2, wherein the hollow tube is made of an aluminum-copper alloy.

8. A method as claimed in claim 2, wherein the hollow tube has a blackened inside wall.

9. A method as claimed in claim 1, wherein the heat-conductive gas is helium.

10. A method as claimed in claim 1, wherein the heat-conductive gas is hydrogen.

11. A method as claimed in claim 1, wherein the heat-conductive gas is a helium-hydrogen mixture.

12. A method as claimed in claim 1, wherein the heat-conductive gas flows through the cooling tube opposite the direction the fiber passes through the tube.

13. A method as claimed in claim 1, wherein the method further comprises the step of flowing a gas around the hot fiber in a direction opposite to the direction of movement of the fiber before the fiber enters the cooling tube.

14. A method as claimed in claim 1, wherein the method further comprises the step of surrounding the fiber with a dry and dust-free gas after the fiber exits the tube.

15. A method as claimed in claim 14, wherein the dry and dust-free gas is nitrogen.

16. A method of manufacturing an optical fiber with a protective coating, said method comprising the steps of:

providing a hot glass preform;

drawing a hot optical fiber from the end of said hot preform;

passing the hot fiber through a hollow metal cooling tube, having inner and outer walls and comprising means for providing an atmosphere of a heat-conductive gas in the space enclosed by the hollow tube and a second tube surrounding the cooling tube having means for cooling the outer wall of the cooling tube with a coolant, said tube being heat conductive and having ends containing apertures;

cooling the tube to a temperature below ambient temperature using a non-cryogenic coolant;

flowing a heat-conductive gas selected from the group of hydrogen, helium or a helium-hydrogen mixture through the cooling tube without first cooling said gas so as to cool and conduct heat from the fiber sufficient to permit coating of the cooled fiber with a coating material without adversely affecting the coating material, a substantial amount of the heat being removed by the conducting of heat from the fiber to the tube by the heat-conductive gas, said gas flow being at least that flow that is sufficient to prevent the penetration of the surrounding atmosphere through the apertures of the ends of said cooling tube and to compensate for loss of gas through said end apertures but less than that flow that prevents the penetration of the surrounding atmosphere through the apertures of the ends of said cooling tube; and coating the cooled fiber with a protective coating.

17. A method as claimed in claim 16, characterized in that the gas flow is less than about 332 cubic millimeters per second per square millimeter.

* * * * *

UNITED STATES PATENT AND TRADEMARK OFFICE
CERTIFICATE OF CORRECTION

PATENT NO. : 4,913,715

DATED : April 3, 1990

INVENTOR(S) : CORNELIS M.G. JOCHEM ET AL

It is certified that error appears in the above-identified patent and that said Letters Patent is hereby corrected as shown below:

Column 3, line No. 36, delete "heast" and insert —heat—.

Signed and Sealed this

Thirty-first Day of December, 1991

*Attest:*

HARRY F. MANBECK, JR.

*Attesting Officer*      *Commissioner of Patents and Trademarks*